United States Patent
Zhou et al.

(10) Patent No.: US 12,518,132 B2
(45) Date of Patent: Jan. 6, 2026

(54) FAST EVALUATION METHOD OF SITE SEISMIC LIQUEFACTION HAZARD BASED ON ARTIFICIAL INTELLIGENCE ALGORITHM

(71) Applicant: ZHEJIANG UNIVERSITY, Zhejiang (CN)

(72) Inventors: Yanguo Zhou, Zhejiang (CN); Chun Wang, Zhejiang (CN); Duanyang Zhuang, Zhejiang (CN); Dongchao Zhang, Zhejiang (CN); Yunmin Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 292 days.

(21) Appl. No.: 18/278,850

(22) PCT Filed: Apr. 26, 2022

(86) PCT No.: PCT/CN2022/089357
§ 371 (c)(1),
(2) Date: Feb. 7, 2024

(87) PCT Pub. No.: WO2022/242435
PCT Pub. Date: Nov. 24, 2022

(65) Prior Publication Data
US 2025/0322205 A1    Oct. 16, 2025

(30) Foreign Application Priority Data

May 21, 2021    (CN) .......................... 202110558271.9

(51) Int. Cl.
*G06N 3/042* (2023.01)
*G06F 16/951* (2019.01)

(52) U.S. Cl.
CPC ........... *G06N 3/042* (2023.01); *G06F 16/951* (2019.01)

(58) Field of Classification Search
CPC .......... G06N 3/042; G01V 1/28; G01V 1/282; G01V 1/30; G01V 1/307
See application file for complete search history.

(56) References Cited

U.S. PATENT DOCUMENTS

| | | | |
|---|---|---|---|
| 2006/0087919 A1* | 4/2006 | Dewhurst | G01V 1/30 367/73 |
| 2020/0299918 A1* | 9/2020 | Moody | E02D 27/34 |

(Continued)

FOREIGN PATENT DOCUMENTS

| | | |
|---|---|---|
| CN | 104361219 | 2/2015 |
| CN | 111458748 | 7/2020 |

(Continued)

OTHER PUBLICATIONS

"International Search Report (Form PCT/ISA/210) of PCT/CN2022/089357", mailed on Jul. 22, 2022, with English translation thereof, pp. 1-5.

(Continued)

*Primary Examiner* — Grace Park
(74) *Attorney, Agent, or Firm* — JCIPRNET (57) ABSTRACT

Disclosed in the present disclosure is a fast evaluation method of site seismic liquefaction hazard based on artificial intelligence algorithm: establishing a historical seismic and site information database, the database including a demand input module, a web crawler module, a data processing module, and a database module connected in sequence; a neural network model performs prediction to acquire a post-earthquake site dominant frequency; and, on the basis of the post-earthquake site dominant frequency, acquiring a site earthquake damage degree and seismic performance parameters. The present disclosure solves the problem of fast evaluating post-earthquake site earthquake damage and (Continued)

site seismic performance parameters, and can rapidly evaluate the site liquefaction or softening earthquake damage degree and site seismic performance parameters in given earthquake conditions.

8 Claims, 8 Drawing Sheets

(56) References Cited

U.S. PATENT DOCUMENTS

| | | | | |
|---|---|---|---|---|
| 2021/0089897 | A1* | 3/2021 | Zhang | G01V 11/00 |
| 2024/0142646 | A1* | 5/2024 | Lindsey | G01V 1/226 |

FOREIGN PATENT DOCUMENTS

| | | |
|---|---|---|
| CN | 112001565 | 11/2020 |
| CN | 112630827 | 4/2021 |
| CN | 113379105 | 9/2021 |
| JP | 2017026569 | 2/2017 |

OTHER PUBLICATIONS

Shihai Chen, "Machine learning-based evaluation of the time variation of predominant frequency of liquefiable deposits and engineering applications," Master's thesis, Apr. 2022, College of Civil Engineering and Architecture, Zhejiang University.

Alketa Ndoj et al., "Liquefaction-Induced Ground Deformations Evaluation Based on Cone Penetration Tests (CPT)," World Journal of Engineering and Technology, Sep. 2014, pp. 1-12.

Yan-Guo Zhou et al., "Laboratory Investigation on Assessing Liquefaction Resistance of Sandy Soils by Shear Wave Velocity," Journal of Geotechnical and Geoenvironmental Engineering, Aug. 2007, pp. 959-972.

Yasuhiro Shamoto et al., "Evaluation of Seismic Settlement Potential of Saturated Sandy Ground Based On Concept of Relative Compression," Soils and Foundations, Sep. 1998, pp. 57-68.

H. Bolton Seed et al., "A Simplified Procedure for Evaluating Soil Liquefaction Potential," Earthquake Engineering Research Center, Nov. 1970, pp. 1-46.

* cited by examiner

| Occurrence time of earthquake | Global time (d) | The local time since the last major earthquake (log s) | Magnitude | Hypocenter depth (km) | Hypocenter distance (km) | Horizontal peak acceleration 1 (m/s/s) | Horizontal peak acceleration 2 (m/s/s) | Vertical peak acceleration (m/s/s) | Azimuth angle (°) | Absolute cumulative acceleration cav | Arias intensity ia | Main frequency of horizontal acceleration signal 1 (hz) | Main frequency of horizontal acceleration signal 2 (hz) | cav5 | Site dominant frequency f(hz) |
|---|---|---|---|---|---|---|---|---|---|---|---|---|---|---|---|
| 2010/9/3 16:35:41 | 0 | 1.908485019 | 7.2 | 11 | 38 | 2113 | 2577.1 | 2337.2 | 269.2284 | 113.4458 | 13.49569 | 1.7938 | 1.0938 | 107.9409 | 1.526 |
| 2010/9/3 16:37:02 | 0.000938 | 1.982271233 | 5.81 | 10 | 25 | 157.3 | 262.5 | 339.7 | 262.1813 | 28.04415 | 0.376133 | 2.1 | 1.8125 | 18.35438 | 1.77 |
| 2010/9/3 16:37:17 | 0.001111 | 2.06069784 | 5.11 | 8 | 25 | 2113 | 2577.1 | 2337.2 | 233.2343 | 113.4458 | 13.49569 | 1.7938 | 1.0938 | 107.9409 | 1.77 |
| 2010/9/3 16:37:36 | 0.001331 | 2.193124598 | 5.53 | 12 | 28 | 161.2 | 255.3 | 342.7 | 260.1273 | 21.16106 | 0.194478 | 2.4563 | 2.1438 | 8.494356 | 1.77 |
| 2010/9/3 16:38:17 | 0.001806 | 2.257678575 | 5.43 | 6 | 37 | 161.3 | 234 | 189 | 279.0141 | 9.822181 | 0.066956 | 2.5794 | 3.0079 | 2.416126 | 1.814 |
| 2010/9/3 16:38:42 | 0.002095 | 2.305351369 | 5.16 | 10 | 42 | 2113 | 2577.1 | 2337.2 | 274.6573 | 113.4458 | 13.49569 | 1.7938 | 1.0938 | 107.9409 | 1.814 |
| 2010/9/3 16:39:03 | 0.002338 | 2.526339277 | 5.34 | 18 | 44 | 45.8 | 106.8 | 140 | 255.2042 | 4.825684 | 0.0255 | 2.2336 | 2.3877 | 0.86404 | 1.921 |
| 2010/9/3 16:41:17 | 0.003889 | 2.57863921 | 4.97 | 10 | 28 | 100.6 | 179.6 | 170.7 | 255.3744 | 7.323399 | 0.032269 | 2.6562 | 2.2812 | 1.079445 | 2.001 |
| 2010/9/3 16:42:00 | 0.004387 | 2.600972896 | 4.82 | 5 | 26 | 100.6 | 179.6 | 170.7 | 233.2898 | 7.323399 | 0.032269 | 2.6562 | 2.2812 | 1.079445 | 1.829 |
| 2010/9/3 16:42:20 | 0.004618 | 2.609594409 | 4.95 | 11 | 35 | 100.6 | 179.6 | 170.7 | 247.6595 | 7.323399 | 0.032269 | 2.6562 | 2.2812 | 1.079445 | 1.814 |
| 2010/9/3 16:42:28 | 0.004711 | 2.629409599 | 4.91 | 8 | 31 | 100.6 | 179.6 | 170.7 | 247.0072 | 7.323399 | 0.032269 | 2.6562 | 2.2812 | 1.079445 | 1.968 |
| 2010/9/3 16:42:47 | 0.004931 | 2.669316881 | 4.98 | 9 | 20 | 100.6 | 179.6 | 170.7 | 242.4407 | 7.323399 | 0.032269 | 2.6562 | 2.2812 | 1.079445 | 1.814 |
| 2010/9/3 16:43:28 | 0.005405 | 2.69019608 | 5.14 | 9 | 39 | 100.6 | 179.6 | 170.7 | 255.6856 | 7.323399 | 0.032269 | 2.6562 | 2.2812 | 1.079445 | 1.905 |
| 2010/9/3 16:43:51 | 0.005671 | 2.7084209 | 4.57 | 13 | 31 | 48.3 | 58.2 | 75.3 | 250.0938 | 2.144681 | 0.006249 | 2.8375 | 2.7927 | 0.114613 | 2.135 |
| 2010/9/3 16:44:12 | 0.005914 | 2.745074792 | 4.49 | 11 | 23 | 123.6 | 267.6 | 339.9 | 232.5074 | 10.43162 | 0.116015 | 2.3134 | 3.0991 | 4.51699 | 2.152 |
| 2010/9/3 16:44:57 | 0.006435 | 2.770852012 | 5.36 | 7 | 39 | 136.9 | 288.3 | 339.9 | 280.172 | 10.42973 | 0.127477 | 2.3134 | 3.0991 | 5.062036 | 2.224 |
| 2010/9/3 16:45:31 | 0.006829 | 2.869818208 | 4.73 | 19 | 21 | 136.9 | 288.3 | 339.9 | 243.744 | 10.42973 | 0.127477 | 2.6625 | 2.575 | 5.062036 | 2.188 |
| 2010/9/3 16:48:02 | 0.008576 | 2.873901598 | 4.43 | 13 | 25 | 136.9 | 288.3 | 339.9 | 245.3216 | 10.42973 | 0.127477 | 2.9091 | 3.1429 | 5.062036 | 2.213 |
| 2010/9/3 16:48:09 | 0.008657 | 2.88592634 | 4.38 | 31 | 37 | 136.9 | 288.3 | 339.9 | 253.2008 | 10.42973 | 0.127477 | 2.3059 | 2.4118 | 5.062036 | 2.144 |
| 2010/9/3 16:48:30 | 0.0089 | 2.896526217 | 4.32 | 6 | 21 | 136.9 | 288.3 | 339.9 | 226.0962 | 10.42973 | 0.127477 | 2.814 | 3.5581 | 5.062036 | 1.956 |
| 2010/9/3 16:48:49 | 0.00912 | 2.936513742 | 4.95 | 9 | 27 | 136.9 | 288.3 | 339.9 | 249.3669 | 10.42973 | 0.127477 | 0.6 | 0.6 | 5.062036 | 2.206 |
| 2010/9/3 16:50:05 | 0.01 | 3.01494035 | 4.66 | 9 | 39 | 67.1 | 64.4 | 80.9 | 270.1806 | 2.038044 | 0.005382 | 0.6 | 0.6 | 0.101761 | 1.921 |
| 2010/9/3 16:52:56 | 0.011979 | 3.089551883 | 5.47 | 7 | 21 | 213.8 | 415.9 | 653.3 | 245.7632 | 12.37537 | 0.306655 | 0.6 | 0.6 | 8.577941 | 2.05 |
| 2010/9/3 16:56:10 | 0.014225 | 3.408239965 | 4.75 | 10 | 37 | 44.4 | 67.5 | 100 | 250.8564 | 1.509696 | 0.006083 | 0.6 | 0.6 | 0.177137 | 1.89 |
| 2010/9/3 17:18:21 | 0.02963 | 3.410945859 | 4.73 | 8 | 40 | 43.5 | 143.1 | 74.3 | 257.5831 | 4.282781 | 0.016104 | 3.4242 | 3.0303 | 0.376698 | 2.113 |
| 2010/9/3 17:18:37 | 0.029815 | 3.433449794 | 5.05 | 6 | 37 | 43.5 | 143.1 | 74.3 | 259.666 | 4.282781 | 0.016104 | 2.4853 | 2.2721 | 0.376698 | 2.279 |

FAST EVALUATION METHOD OF SITE SEISMIC LIQUEFACTION HAZARD BASED ON ARTIFICIAL INTELLIGENCE ALGORITHM

CROSS-REFERENCE TO RELATED APPLICATION

This application is a 371 of international application of PCT application serial no. PCT/CN2022/089357, filed on Apr. 26, 2022, which claims the priority benefits of China Patent Application No. 202110558271.9, filed on May 21, 2021. The entirety of each of the above-mentioned patent applications is hereby incorporated by reference herein and made a part of this specification.

TECHNICAL FIELD

The disclosure belongs to a rapid evaluation method of site seismic liquefaction disaster in the technical field of earthquake engineering geological hazard prevention and computing. Specifically, the disclosure relates to a rapid evaluation method of site seismic liquefaction hazard based on artificial intelligence.

DESCRIPTION OF RELATED ART

As population and economic activities are concentrated in cities, for urban buildings affected by the action of earthquake hazards, it is not only necessary to consider whether the strength of buildings under earthquake hazards meets requirements to ensure people's safety, but also it is necessary to consider the effects caused by disruption of building's functions due to earthquake hazards. The demand for seismic strength design arises accordingly. That is, for some important buildings such as control centers of hospitals, energy system, communication system, and transportation system, the damage to the functions of these facility will lead to large-scale suspension of social functions. It is necessary to estimate the time and resources required to restore the original social functions after an earthquake.

Figure 2:
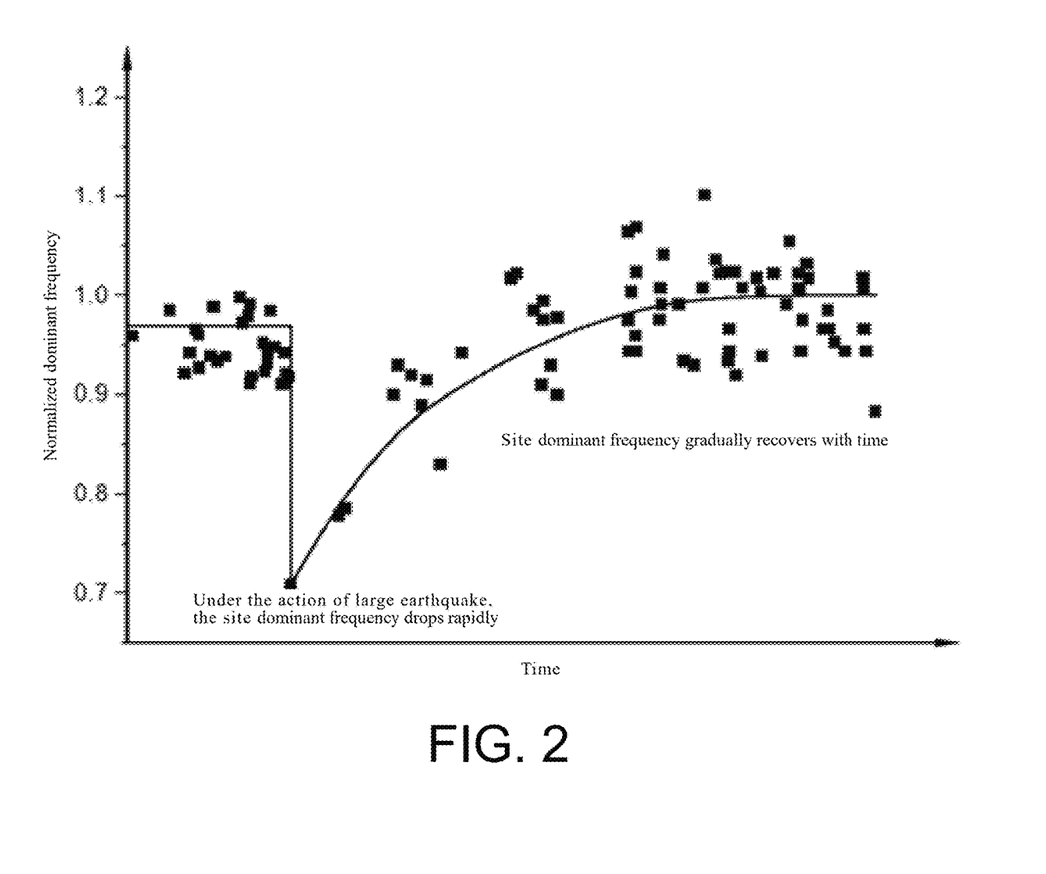
FIG. 2 is a schematic diagram of the decline and recovery of the post-earthquake site dominant frequency.

Large earthquakes will cause a site's seismic performance to decline rapidly, but it gradually restores to the previous level over time, as shown in FIG. 2. The time and magnitude of earthquakes are difficult to be predicted. If a building is put into use rashly, it is possible that under the action of an earthquake that is less than the original design standard, the foundation will suffer greater damage, endangering the safety of people and property in the building.

In most cases, on-site surveys are adopted for current evaluation of site seismic liquefaction hazards, or empirical models are established to evaluate earthquake hazards based on surveys of historical earthquakes in many places. The shortcoming of on-site surveys is that investigations are carried out after the earthquake. The shortcoming of the empirical method is that the data points in the database will contain a wide variety of soil properties, and the evaluation outcome is often the most unfavorable situation, and usually conservative. Moreover, the empirical methods don't take account of the changes in site properties after large earthquakes, and only use the existing on-site survey results as a basis for evaluation of on-site earthquake hazard.

A seismic station is able to monitor the situation of a site in real time. This information not only reflects the nature of the earthquake, but also reflects the nature of the site. Using the information collected from large earthquake stations as a supplement to earthquake hazard evaluation may better reflect real-time changes in site properties.

SUMMARY

In order to solve the problem of conventional methods in which the evaluation of site performance does not take into consideration whether the earthquake causes decline of site performance and whether the site performance is restored over time, and the pre-earthquake on-site test parameters are adopted as the basis for determining whether the performance of all aspects of the site meets the requirements, the disclosure provides a fast evaluation method of site seismic liquefaction (softening) hazard based on artificial intelligence algorithm, which is able to quickly evaluate the performance parameters of various aspects of the site after the earthquake or within a period of time after the earthquake. The disclosure is able to quickly evaluate the damage degree of the site under given seismic conditions and the comprehensive service performance of the site.

Figure 1:
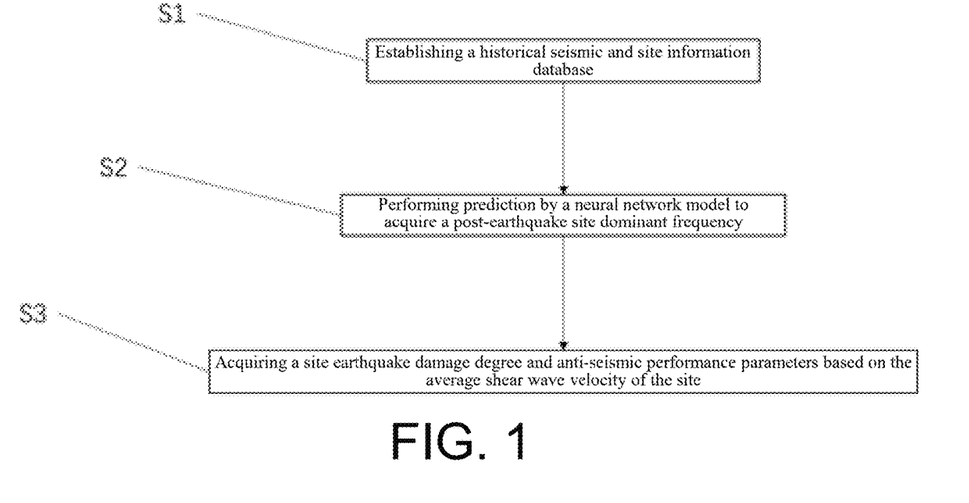
FIG. 1 is a technical flow chart of the method in the disclosure.

As shown in FIG. 1, the technical solution adopted in the present disclosure is: S1: establishing a historical seismic and site information database, wherein a site dominant frequency is included; S2: performing prediction by a neural network model according to the result of S1 to acquire a post-earthquake site dominant frequency; and S3: acquiring a site earthquake damage degree and seismic performance parameters on the basis of the post-earthquake site dominant frequency.

In the step S1, establishing a historical seismic and site information database includes a demand input module, a web crawler module, a data processing module, and a database module connected in sequence.

The demand input module receives the input seismic station information and ground motion signal collection time range and then sends the above information to the web crawler module.

The seismic station information is a specific seismic station number or a given latitude and longitude range, thereby defining a seismic station in a given range.

There should be at least 4 or more major earthquakes greater than magnitude 6.0 occurred within the ground motion signal collection time range, and the time interval between two major earthquakes should not be less than 1 month. If the input time range does not meet the requirements, the time range will be automatically adjusted until required time frame is met.

The web crawler module receives the seismic station information and the ground motion signal collection time range from the demand input module. According to the seismic station number and the ground motion signal collection time range, a web crawler is utilized on the large earthquake database website to crawl the seismic station corresponding to the seismic station number and all public ground motion signals, basic earthquake information and site information within the ground motion signal collection time range under the large earthquake station, thereby illustrating a summary table of basic earthquake information. The ground motion signal, basic earthquake information and site information are sent to the data processing module, and the summary table of basic earthquake information is sent to the database module.

The ground motion signal refers to an acceleration time-history signal in three orthogonal directions including two horizontal directions and one vertical direction. Each earthquake corresponds to a seismic station and may have zero or one ground motion signal.

The basic earthquake information refers to the ground motion number, earthquake time, magnitude, hypocenter location, hypocenter distance, hypocenter depth, azimuth of the hypocenter relative to the large earthquake station, etc. corresponding to all ground motion signals within a period of time. The ground motion number is composed of aseismic station number and the time when the earthquake occurred.

The site information includes soil layer distribution, soil and topographical parameters of where the seismic station is located.

The data processing module receives the ground motion signal from the web crawler module for analysis and processing, and obtains dominant frequency of acceleration time-history signals in two horizontal directions, three earthquake intensity parameters and site dominant frequency of where large earthquake stations are located, then organizes the above information into a summary table of earthquake supplementary information and sends the summary table to the database module.

The database module receives the summary table of basic earthquake information from the web crawler module and the summary table of earthquake supplementary information from the data processing module and merges them according to the ground motion signal to obtain the summary table of earthquake information, then split the summary table of earthquake information of all seismic stations into multiple sub-tables according to different large earthquake stations. Each seismic station corresponds to a sub-table, and the information in each sub-table is arranged in chronological order to obtain a summary table of earthquake information for a single large earthquake station, and the site information of the site where the seismic station is located corresponds to the summary table of earthquake information for each single large earthquake station.

In the data processing module, the site dominant frequency of where the seismic station is located is processed and obtained according to the ground motion signal. The calculation process is performed through the following steps.

S1.1. The ground motion signal is split into n parts according to the length of the window, and the n windows are subjected to the horizontal-to-vertical spectral ratio analysis to obtain n horizontal-to-vertical spectral ratio spectrums of the ground motion signal. The horizontal axis of the horizontal-to-vertical spectral ratio spectrum is the frequency, and the vertical axis is the horizontal-to-vertical spectral ratio. In the horizontal-to-vertical spectral ratio spectrum of each window, the frequency corresponding to the maximum horizontal-to-vertical spectral ratio is taken as the dominant frequency of the window.

S1.2. In the horizontal-to-vertical spectral ratio spectrum of each window, the frequency of the horizontal axis of the horizontal-to-vertical spectral ratio spectrum remains unchanged, and an average of the horizontal-to-vertical spectral ratio of the vertical axis is taken to perform curve smoothing to obtain the median curve of the window corresponding to the horizontal-to-vertical spectral ratio spectrum. The frequency corresponding to the maximum amplitude of the median curve is taken as the reference frequency $f_{t,m,0}$ of the window.

S1.3. The first dominant frequency set $X_0=[f_{t,1}, f_{t,2}, \ldots, f_{t,n}]$ is established from the dominant frequencies of all windows, wherein $f_{t,n}$ represents the dominant frequency of the n-th window at time t, the mean $\bar{f}_{t,0}$ and standard deviation $\sigma_{ft,0}$ of the first dominant frequency set $X_0$ are calculated, and then the offset $y_0=|f_{t,m,0}-\bar{f}_{t,0}|$ is calculated.

S1.4. In the first dominant frequency set $X_0$, the windows whose dominant frequencies fall outside ($\bar{f}_{t,0}-0.5\sigma_{ft,0}$, $\bar{f}_{t,0}+0.5\sigma_{ft,0}$) are deleted, the horizontal-to-vertical spectral ratios of the remaining m windows are averaged and subjected to curve smoothing, thereby obtaining the median curve dominant frequency $f_{t,m,1}$ of each of the m windows.

S1.5. In the second dominant frequency set $X_1=[f_{t,1}, f_{t,2}, \ldots, f_{t,m}]$ established from the dominant frequencies of the remaining m windows, the mean value $\bar{f}_{t,1}$ and the standard deviation $\sigma_{ft,1}$ of the second dominant frequency set $X_1$ are calculated, and then the offset $y_1=|f_{t,m,1}-\bar{f}_{t,1}|$ is calculated.

S1.6. The absolute value of the standard deviation difference between the first dominant frequency set $X_0$ and the second dominant frequency set $X_1$ before and after the deletion of window is set as the first offset parameter $\varepsilon_1$, i.e., $\varepsilon_1=|\sigma_{ft,1}-\sigma_{ft,0}|$. The absolute value of the offset difference between the first dominant frequency set $X_0$ and the second dominant frequency set $X_1$ before and after the deletion of window is set as the second offset parameter $\varepsilon_2$, that is, $\varepsilon_2=|y_1-y_0|/y_0$.

S1.7. Judgment is made according to the first offset parameter $\varepsilon_1$ and the second offset parameter $\varepsilon_2$.

When the first offset parameter $\varepsilon_1$ and the second offset parameter $\varepsilon_2$ are both greater than or equal to 0.01, the remaining m windows are used as all windows and return to S1.3 for processing, and the next loop iteration is performed.

When the first offset parameter $\varepsilon_1$ and the second offset parameter $\varepsilon_2$ are both less than 0.01, the median curve dominant frequency obtained from the last loop iteration is used as the site dominant frequency of the ground motion signal.

The step S2 includes: establishing a dominant frequency prediction model of a neural network, and establishing a gated cyclic unit model, which is used to process the summary table of earthquake information of a single seismic station; training, testing and saving the dominant frequency prediction model, and using the ground motion information, ground motion intensity, dominant frequency of acceleration in the horizontal direction and site information in the summary table of earthquake information of a single seismic station as the inputs of the model, and using the site dominant frequency as the output of the model, inputting the above information to the dominant frequency prediction model for training, and testing and saving the dominant frequency prediction model after the training; in the prediction of the dominant frequency prediction model, inputting the ground motion information, the earthquake intensity index, the dominant frequency of the acceleration in the horizontal direction, and the site information to be predicted into the dominant frequency prediction model after the training, testing and saving, and obtaining the post-earthquake site dominant frequency as the output.

The step S3 includes: obtaining the site earthquake damage degree and seismic performance parameters based on the average shear wave velocity of the site, wherein the site earthquake damage degree refers to the degree of settlement, lateral displacement and pore pressure rise of the foundation, the site seismic performance parameters refer to the soil liquefaction resistance and response spectrum curve of the site, as well as the reduction of the bearing capacity of the pile foundation.

S3.1. The average shear wave velocity of the site is obtained by calculating the post-earthquake site dominant frequency of where the seismic station is located.

S3.2. The increasing degree of pore pressure at the site where the seismic station is located is calculated.

S3.3. The site category and the site response spectrum curve are obtained according to the average shear wave velocity of the site and the thickness of the soil layer of the site.

S3.4. The distribution of post-earthquake site shear wave velocity along the depth is calculated, and the soil liquefaction resistance and liquefaction safety factor of each soil layer are processed and obtained according to the distribution of the shear wave velocity along the depth.

S3.5. The reduction amount of pile foundation bearing capacity is obtained according to the liquefaction safety factor.

S3.6. The maximum shear strain is calculated according to the liquefaction safety factor, and then the seismic settlement for a horizontal site or the seismic lateral displacement for an inclined site are calculated and obtained according to the maximum shear strain.

In the step S3.1, the average shear wave velocity of the site is obtained as follow:

$$V_{savg} = 4Hf$$

Where $V_{savg}$ represents the average shear wave velocity of the site, H represents the thickness of the soil layer of the site, f represents the post-earthquake site dominant frequency obtained through prediction in step S2.

In the above step S3.2, the excess static pore pressure ratio of the site is obtained as the degree of pore pressure rise according to the following equation:

$$1 - r_u(t) = \left[\frac{f_0(t)}{f_{0,t=0}}\right]^4$$

Where $r_u(t)$ represents excess static pore pressure ratio, and $r_u = u/\sigma'_{v0}$, u is excess static pore water pressure, $\sigma'_{v0}$ is effective overburden stress, $f_0(t)$ represents site dominant frequency after earthquake, $f_{0,t=0}$ represents the initial site dominant frequency before earthquake.

In the above step S3.3, the site category is determined through the thickness of the soil layer and the average shear wave velocity of the site, and then the site response spectrum curve is provided.

In the step S3.4, the distribution of site average shear wave velocity along the depth is obtained according to the following equation:

$$V_{s\,post-earthquake} = V_{s\,pre-earthquake}\left(\frac{V_{savg\,post-earthquake}}{V_{savg\,pre-earthquake}}\right)$$

Where $V_{s\,post-earthquake}$ represents the distribution of shear wave velocity after the earthquake, $V_{s\,pre-earthquake}$ represents the distribution of shear wave velocity before the earthquake, $V_{savg\,post-earthquake}$ represents the average shear wave velocity of the site after the earthquake, $V_{savg\,pre-earthquake}$ represents the average shear wave velocity of the site before the earthquake. In the present disclosure, it is considered that the distributions of site shear wave velocity before and after the earthquake are similar.

Then, the soil liquefaction resistance CRR and liquefaction safety factor of different soil layers are calculated respectively according to the distribution of average shear wave velocity along the depth.

The soil liquefaction resistance of each soil layer on the site is obtained by the following equations:

$$CRR = r_c \frac{1}{P_a}\left[\frac{k_N \rho}{F(e_{min})}\right]^2 V_{s1}^4$$

$$V_{s1} = V_{s\,post-earthquake}\left(\frac{1+K_0}{3}\right)^{0.25}\left(\frac{P_a}{\sigma'_{v0}}\right)^m$$

CRR represents the soil liquefaction resistance of the soil layer, $r_c$ represents the reduction coefficient of multi-directional seismic vibration, $P_a$ represents the normalized reference pressure, which is taken as 100 kpa, $k_N$ represents the correlation coefficient between the strength and toughness of the soil, which is determined by experiments, $\rho$ represents soil density, $F(e_{min})$ represents a function only related to the minimum void ratio, $V_{s1}$ represents shear wave velocity corrected by effective overburden stress, $K_0$ represents the lateral pressure coefficient of soil layer, which is taken as 0.5 for normal consolidated soil, $P_a=100$ kpa, $\sigma'_{v0}$ represents the effective overburden stress of the soil layer; $V_{s1}$ represents the normalized shear wave velocity after considering correction of the effective overburden stress.

Then the liquefaction safety factor FS is calculated through the following equations according to the soil liquefaction resistance:

$$FS = \frac{CRR}{CSR}$$

$$CSR = 0.65\left(\frac{a_{max}}{g}\right)\left(\frac{\sigma_{v0}}{\sigma'_{v0}}\right)r_d$$

Where CSR represents the cyclic shear stress ratio caused by the earthquake, $a_{max}$ represents the peak horizontal acceleration of the surface, g represents the acceleration of gravity, $\sigma_{v0}$ represents the total overburden stress of the soil layer, $\sigma'_{v0}$ represents the effective overburden stress of the soil layer, $r_d$ represents reduction coefficient of shear stress along depth.

In the above step S3.5, the reduction amount of the pile foundation bearing capacity is determined according to the liquefaction safety factor.

In the above step S3.6, the maximum shear strain $\gamma_{max}$ is obtained according to the liquefaction safety factor through the following equations:

$$F_\alpha = 0.032 + 0.836\left(\frac{V_{s1}}{100}\right)^{1.976} - 0.190\left(\frac{V_{s1}}{100}\right)^{3.952}$$

$$\begin{cases} \gamma_{max} = 0, \ FS > 2 \\ \gamma_{max} = \min(0.5,\ 7.05(V_{s1}/100)^{-5.33}, \\ 0.035(2-FS)\left(\frac{1-F_\alpha}{FS-F_\alpha}\right)\!\Big), \ F_\alpha < FS < 2 \\ \gamma_{max} = \min(0.5,\ 7.05(V_{s1}/100)^{5.33}), \ FS < F_\alpha \end{cases}$$

Where $F_\alpha$ represents the reference value of liquefaction safety factor.

Then the terrain characteristics of the site are determined: if the site is an inclined site, the seismic lateral displacement is obtained according to the maximum shear strain processing; if the site is a horizontal site, the seismic settlement is obtained according to the maximum shear strain processing.

The seismic lateral displacement is determined through the following equation:

$$LD = C_h \int_0^{z_{max}} \gamma_{max} dz$$

Where LD represents seismic lateral displacement, $C_h$ represents parameters related to local soil properties, which are obtained from the local ground settlement data observed in past earthquakes, $z_{max}$ represents the thickness of the inclined soil layer.

The seismic settlement is determined through the following formula:

$$\Delta e = (e_0 + 0.3 e_{max} - 1.3 e_{min}) R_0^* \gamma_{max}^m$$

$$S = \sum \frac{\Delta e}{1 + e_0} H_i$$

In the formula, $\Delta e$ represents the change in void ratio of foundation soil; $e_0$ represents initial void ratio of soil layer; $e_{max}$ represents maximum void ratio of soil layer; $e_{min}$ represents minimum void ratio of soil layer; S represents total settlement; $H_i$ represents the thickness of the i-th soil layer; $R_0^*$ represents the reference value of the residual volume strain, which is a constant, and m represents the power correlation coefficient between the maximum shear strain and the residual volume strain, which is a constant.

Based on the distribution of the liquefaction safety factor along the depth of the soil layer combined with the formula, the maximum shear strain $\gamma_{max}$ in the case of large earthquakes is obtained.

Figure 3:
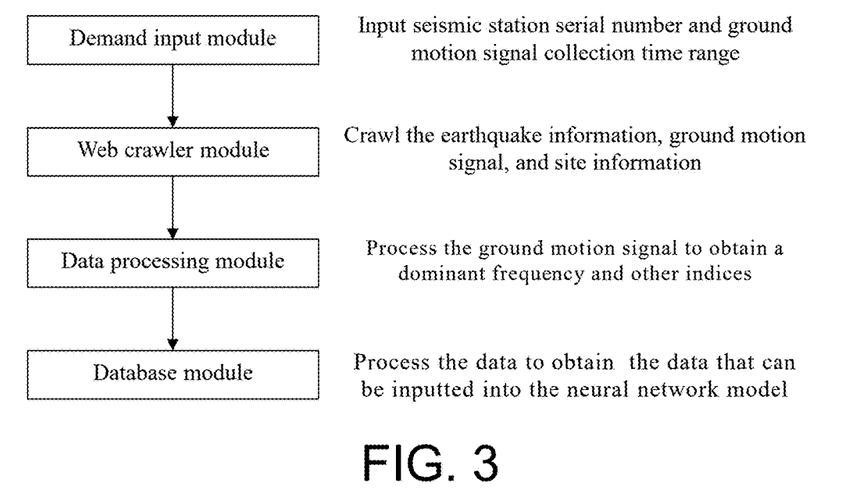
FIG. 3 is a technical flowchart of establishing a historical seismic and site information database.

The process of the method of the present disclosure is automatically implemented by python programming to input the number corresponding to the corresponding seismic station and the site dominant frequency, as shown in FIG. 3, each sub-step may be automatically performed, and the degree of earthquake damage and the seismic performance of the site are provided.

The disclosure includes establishing a historical seismic and site information database, establishing a neural network model to predict the post-earthquake site dominant frequency, and obtaining site earthquake damage degree and site seismic performance parameters based on the average shear wave velocity of the site.

The advantageous effects of the present disclosure are as follows:

The disclosure solves the problem of rapidly evaluating post-earthquake site earthquake damage and site anti-seismic performance parameters, and is able to rapidly evaluate the site liquefaction or softening earthquake damage degree and site anti-seismic performance parameters in given earthquake conditions.

The disclosure adopts the ground motion signal received by the seismic station as the basis, thereby reflecting the property of the site in real time on basis of the above.

Moreover, a method capable of automatically analyzing the horizontal-to-vertical spectral ratios without human intervention, and obtaining the site dominant frequency from the ground motion signals in three directions is provided. In the conventional horizontal-to-vertical spectral ratio analysis, it is necessary to manually select the coda window, and visually check whether the selected result is reasonable, resulting in inconsistent results that might occur when different engineers conduct horizontal-to-vertical spectral ratio analysis. The solution of the present disclosure is able to effectively solve the above problem.

BRIEF DESCRIPTION OF THE DRAWINGS

FIG. 7 is a schematic diagram of a data chart organized by a large earthquake station.

DESCRIPTION OF THE EMBODIMENTS

The present disclosure will be further described below in conjunction with the accompanying drawings and specific implementation.

The implementation process of the embodiment of the present disclosure is as follows:

S1, a historical seismic and site information database is established.

As shown in FIG. 3, establishing a historical seismic and site information database includes a demand input module, a web crawler module, a data processing module, and a database module connected in sequence. In specific implementation, the above process is realized by python programming. After the demand data is input in the demand input module, all subsequent steps may be automatically carried out, and the data will be organized into a format that is easy to read and processed by artificial intelligence algorithms.

The demand input module receives the input seismic station information and ground motion signal collection time range and then sends the above information to the web crawler module.

The web crawler module receives the seismic station information and the ground motion signal collection time range from the demand input module. According to the seismic station number and the ground motion signal collection time range, a web crawler is utilized on the large earthquake database website published worldwide to crawl the seismic station corresponding to the seismic station number and all public ground motion signals, basic earthquake information and site information within the ground motion signal collection time range under the large earthquake station, thereby illustrating a summary table of basic earthquake information mainly through the earthquake basic information. The ground motion signal, basic earthquake information and site information are sent to the data processing module, and the summary table of basic earthquake information is sent to the database module.

The dominant frequency of the acceleration signal in two horizontal directions of the site is obtained by fast Fourier transform to obtain the Fourier spectrum in two horizontal directions, and the frequency corresponding to the point with the largest amplitude is the dominant frequency of the acceleration.

Figure 5:
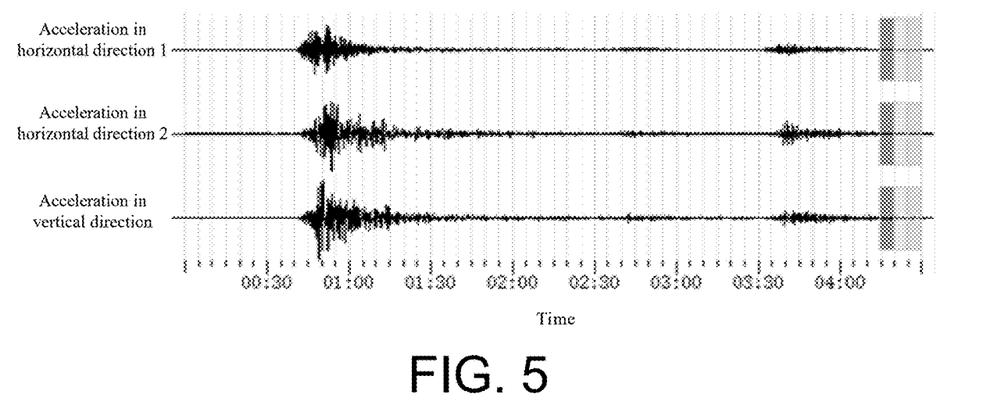
FIG. 5 is a schematic diagram of window selection in the HVSR method (horizontal-to-vertical spectral ratio method).
Figure 6:
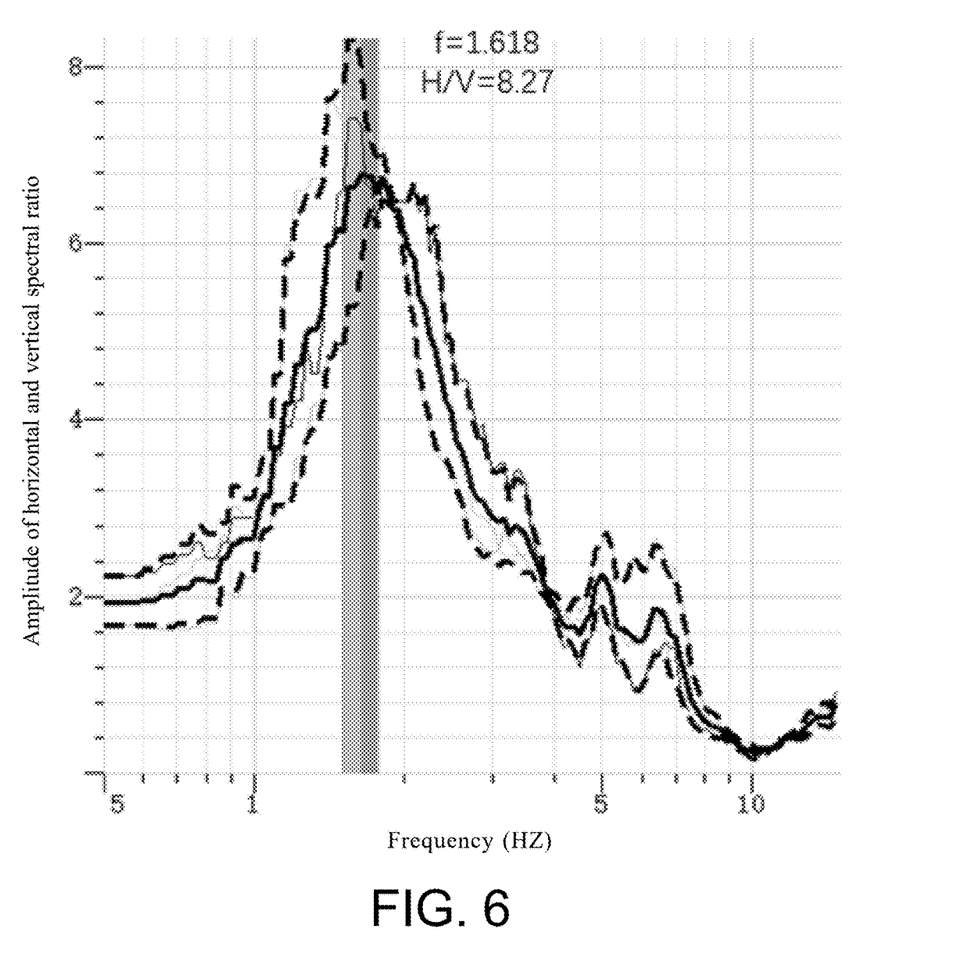
FIG. 6 is a schematic diagram of a horizontal-to-vertical spectral ratio spectrum and determining the site dominant frequency according to the horizontal-to-vertical spectral ratio spectrum.

Obtaining the dominant frequency signal of the site where the seismic station is located refers to performing horizontal-to-vertical spectral ratio (HVSR) analysis on ground motion signals, retrieving two to three windows not having overlapping parts from the coda part of the ground motion signal (the coda signal refers to the part whose acceleration amplitude is significantly less than that of the main shock), and performing the following operations on each of the windows. The two components in the horizontal direction are Fourier transformed and the sum of the squares of the two spectral amplitudes is added and then the square root is used as the horizontal acceleration spectrum H. The acceleration signal in the vertical direction is Fourier transformed as the vertical acceleration spectrum V. Then the horizontal acceleration spectrum is divided by the vertical acceleration spectrum to obtain the horizontal-to-vertical spectral ratio spectrum H/V. The horizontal axis corresponding to the maximum value of H/V serves as the site dominant frequency. The horizontal axes of the horizontal acceleration spectrum H, the vertical acceleration spectrum V and the horizontal-to-vertical spectral ratio spectrum H/V are all frequencies. The vertical axis is the amplitude corresponding to the frequency. The schematic diagram of performing coda selection on acceleration time-history signal is shown in FIG. 5.

The data processing module receives the ground motion signal from the web crawler module for analysis and processing, and obtains dominant frequency of acceleration time-history signals in two horizontal directions, three earthquake intensity parameters and site dominant frequency of where large earthquake stations are located, then organizes the above information into a summary table of earthquake supplementary information and sends the summary table to the database module.

The three earthquake intensity parameters include Arias intensity Ia, two absolute cumulative accelerations CAV and CAV5.

Obtaining the dominant frequencies of where large earthquake stations are located refers to performing horizontal-to-vertical spectral ratio (HVSR) analysis on ground motion signals, retrieving two to three consecutive windows not having overlapping parts from the coda part of the ground motion signal (the coda signal refers to the part whose acceleration amplitude is significantly less than that of the main shock), and performing the following operations on each of the windows. The two components in the horizontal direction are Fourier transformed and the sum of the squares of the two spectral amplitudes is added and then the square root is used as the horizontal acceleration spectrum H. The acceleration signal in the vertical direction is Fourier transformed as the vertical acceleration spectrum V. Then the horizontal acceleration spectrum is divided by the vertical acceleration spectrum to obtain the horizontal-to-vertical spectral ratio spectrum H/V.

The horizontal axes of the horizontal acceleration spectrum H, the vertical acceleration spectrum V and the horizontal-to-vertical spectral ratio spectrum H/V are all frequencies. The vertical axis is the amplitude corresponding to the frequency.

The results with a large frequency difference corresponding to the highest amplitude points of these two or three windows need to be subjected to re-analysis and calculation. For qualified results, these two or three windows determine the upper and lower bounds and mean values of the horizontal-to-vertical spectral ratios, and the obtained frequency corresponding to the maximum amplitude point is used as the site dominant frequency.

The current operation of performing the horizontal-to-vertical spectral ratio method often relies on manually selecting the windows, using the visual method to check the results obtained by the HVSR method, and re-analyzing the unqualified ones. Although this method has been widely used in decades of practice, but the window of each signal needs to be manually selected and checked, which is time-consuming and labor-intensive.

Figure 10:
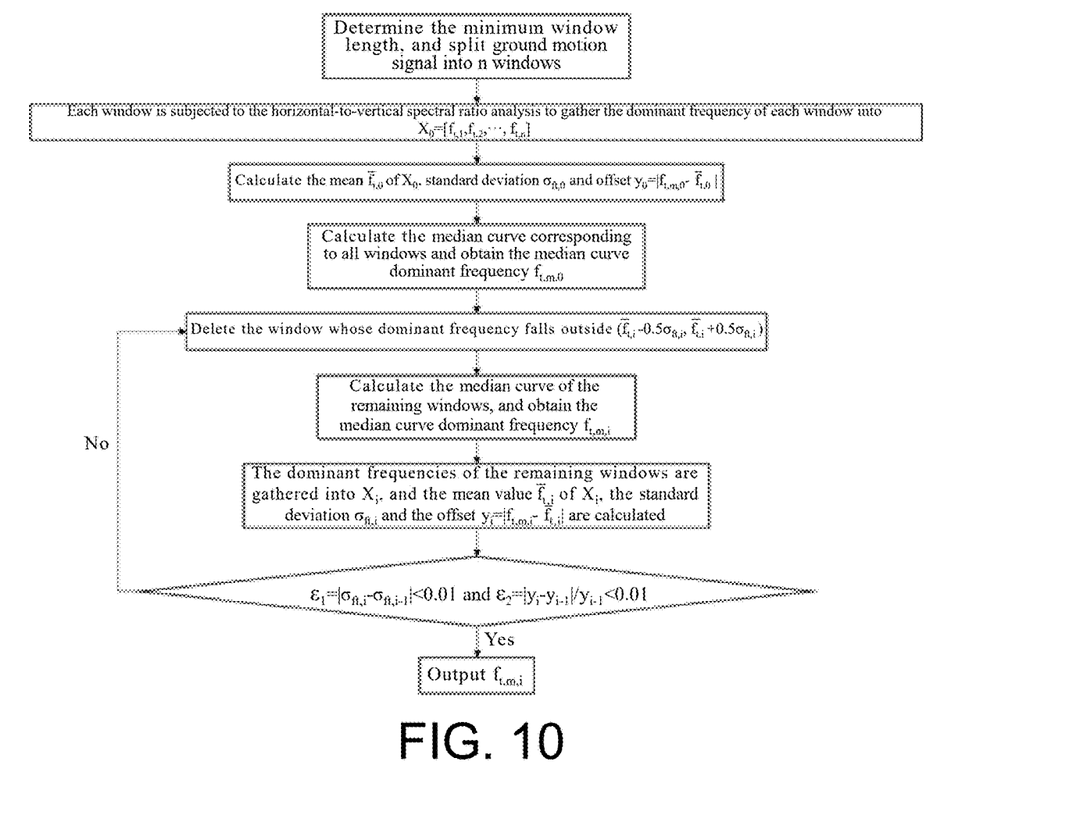
FIG. 10 is a process flow chart of obtaining the site dominant frequency in the present disclosure.

The method for obtaining the site dominant frequency provided by the present disclosure is able to automatically select the uncontaminated time window, delete the contaminated time window, and input the ground motion signal without human intervention to directly obtain the site dominant frequency. The flow chart is shown in FIG. 10.

In the data processing module, the site dominant frequency of where the seismic station is located is processed and obtained according to the ground motion signal through the following steps.

The method based on the horizontal-to-vertical spectral ratio method (HVSR method) is performed to automatically calculate the site dominant frequency. The calculation process is performed through the following steps:

S1.1. The ground motion signal is split into n parts according to the length of the window, the specific window length in implementation is selected as 4 seconds, and the n windows are subjected to the horizontal-to-vertical spectral ratio (HVSR) analysis to obtain n horizontal-to-vertical spectral ratio spectrums (H/V spectrum) of the ground motion signal. One window is subjected to the HVSR analysis to obtain a horizontal-to-vertical spectral ratio spectrum. The horizontal axis of the horizontal-to-vertical spectral ratio spectrum is the frequency, and the vertical axis is the horizontal-to-vertical spectral ratio. In the horizontal-to-vertical spectral ratio spectrum of each window, the frequency corresponding to the maximum horizontal-to-vertical spectral ratio is taken as the dominant frequency of the window.

In specific implementation, 50 times of the sampling period is selected as the minimum value of the window length.

S1.2. In the horizontal-to-vertical spectral ratio spectrum of each window, the frequency of the horizontal axis of the horizontal-to-vertical spectral ratio spectrum remains unchanged, and an average of the horizontal-to-vertical spectral ratio of the vertical axis is taken to perform curve smoothing to obtain the median curve, that is, median HVSR curve, of the window corresponding to the horizontal-to-vertical spectral ratio spectrum. The frequency corresponding to the maximum amplitude of the median curve is taken as the reference frequency $f_{t,m,0}$ of the window.

S1.3. The first dominant frequency set $X_0=[f_{t,1}, f_{t,2}, \ldots, f_{t,n}]$ is established from the dominant frequencies of all windows, wherein $f_{t,n}$ represents the dominant frequency of the n-th window at time t, the mean $\bar{f}_{t,0}$ and standard deviation $\sigma_{ft,0}$ of the first dominant frequency set $X_0$ are calculated, and then the offset $y_0=|f_{t,m,0}-\bar{f}_{t,0}|$ is calculated.

S1.4. In the first dominant frequency set $X_0$, the windows whose dominant frequencies fall outside $(\bar{f}_{t,0}-0.5\sigma_{ft,0}, \bar{f}_{t,0}+0.5\sigma_{ft,0})$ are deleted, the noise-contaminated windows in ground motion signals are deleted, the horizontal-to-vertical spectral ratios of the remaining m windows are averaged and subjected to curve smoothing, thereby obtaining the median curve dominant frequency $f_{t,m,1}$ of each of the m windows.

S1.5. In the second dominant frequency set $X_1=[f_{t,1}, f_{t,2}, \ldots, f_{t,m}]$ established from the dominant frequencies of the remaining m windows, the mean value $\bar{f}_{t,1}$ and the standard deviation $\sigma_{ft,1}$ of the second dominant frequency set $X_1$ are calculated, and then the offset $y_1=|f_{t,m,1}-\bar{f}_{t,1}|$ is calculated.

S1.6. The absolute value of the standard deviation difference between the first dominant frequency set $X_0$ and the second dominant frequency set $X_1$ before and after the deletion of window is set as the first offset parameter $\varepsilon_1$, i.e., $\varepsilon_1=|\sigma_{ft,1}-\sigma_{ft,0}|$. The absolute value of the offset difference between the first dominant frequency set $X_0$ and the second dominant frequency set $X_1$ before and after the deletion of window is set as the second offset parameter $\varepsilon_2$, that is, $\varepsilon_2=|y_1-y_0|/y_0$.

S1.7. Judgment is made according to the first offset parameter $\varepsilon_1$ and the second offset parameter $\varepsilon_2$.

When the first offset parameter $\varepsilon_1$ and the second offset parameter $\varepsilon_2$ are both greater than or equal to 0.01, the remaining m windows are used as all windows and return to S1.3 for processing, and the next loop iteration is performed.

When the first offset parameter $\varepsilon_1$ and the second offset parameter $\varepsilon_2$ are both less than 0.01, the median curve dominant frequency obtained from the last loop iteration is used as the site dominant frequency of the ground motion signal.

Figure 11:
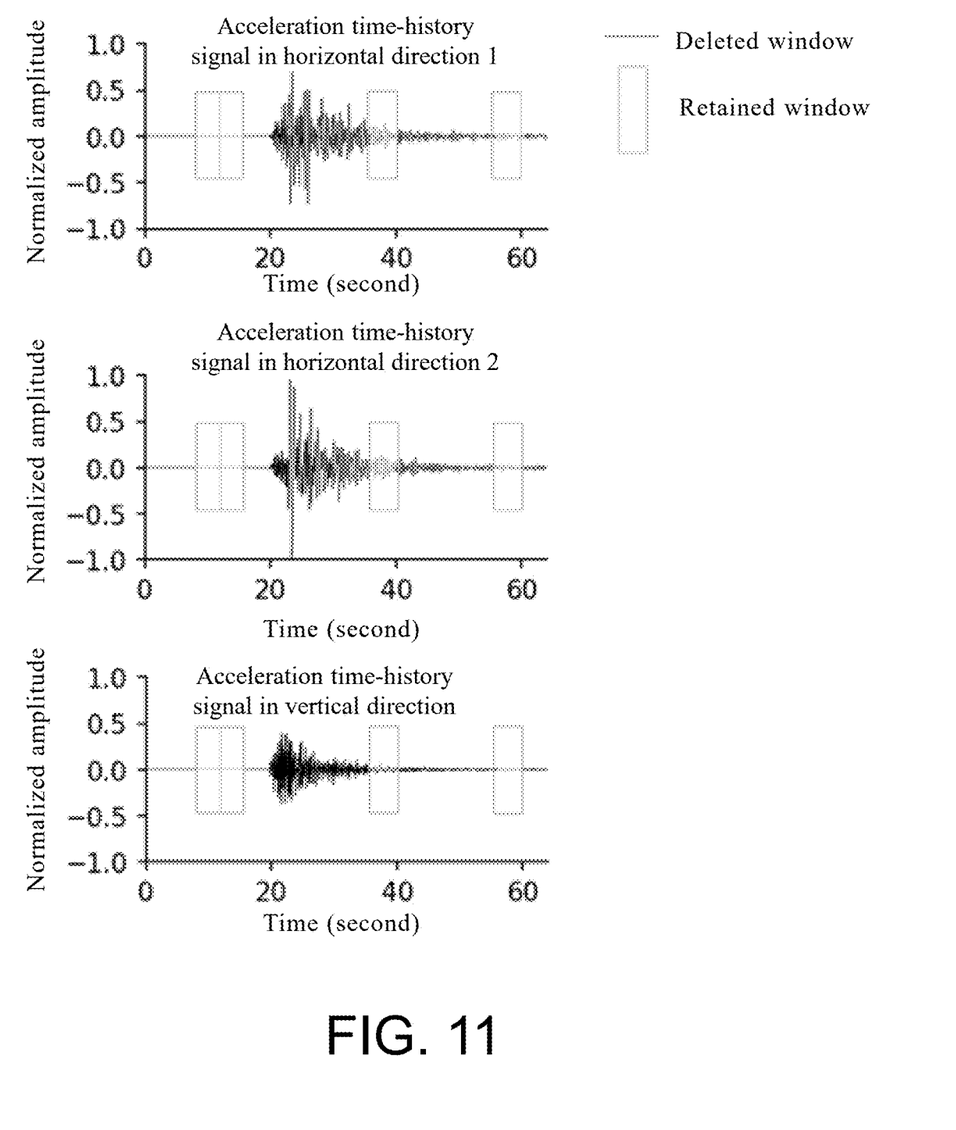
FIG. 11 is an effect diagram of automatically selecting the coda wave window of the ground motion signal in the present disclosure.

FIG. 11 is a schematic diagram of the acceleration time-history signal in three directions of a ground motion signal. The final result of window selection is shown in the light-colored box in the figure. A total of 16 windows were selected, 12 windows were deleted, and finally 4 windows were left.

Figure 12:
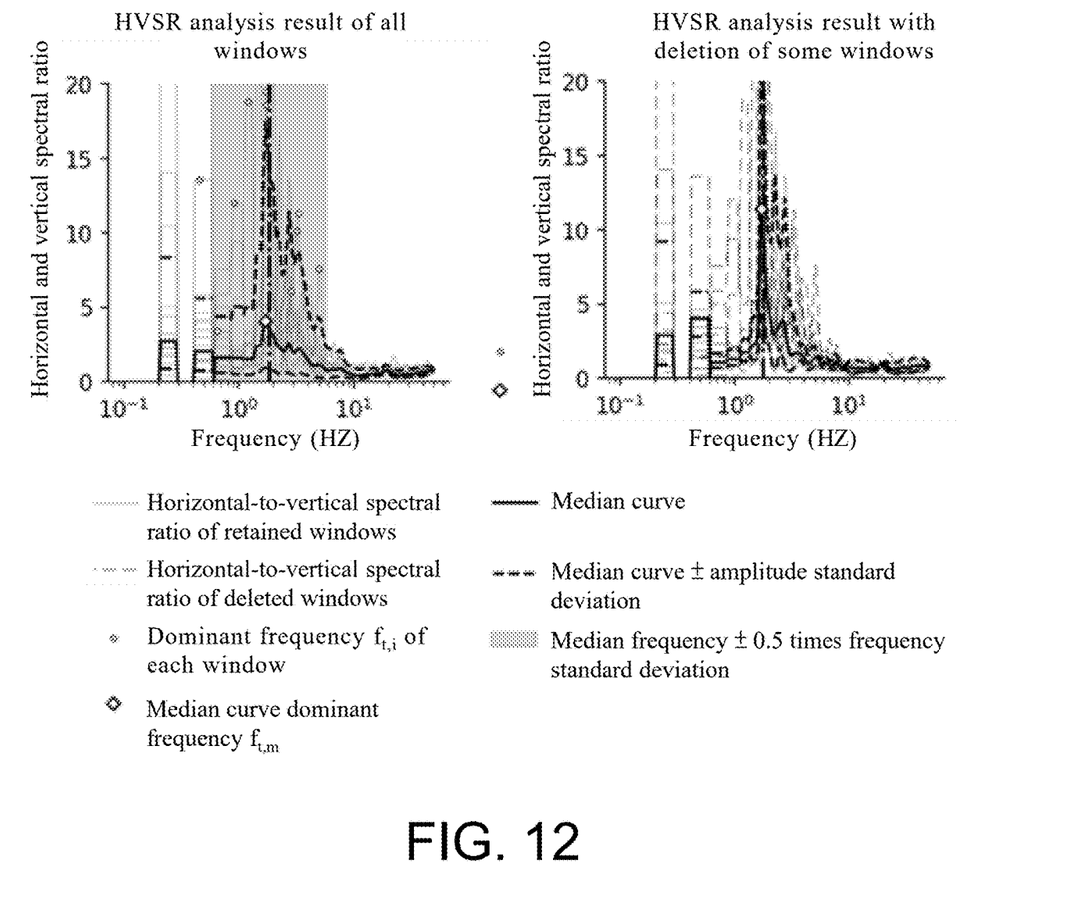
FIG. 12 is an effect diagram of obtaining the site dominant frequency by automatically performing horizontal-to-vertical spectral ratio analysis in the present disclosure.

FIG. 12 is an analysis result of the ground motion signal. The left figure is the initial HVSR analysis result without deletion of windows, and the right figure is the HVSR analysis result after the window affected by noise is deleted. It can be seen that the frequencies obtained from the initial HVSR analysis results are scattered. The standard deviation (the gray shaded part in the figure) is relatively large After the program automatically deletes some windows, the dominant frequencies obtained are relatively concentrated, which may meet the needs for actual use. The median curve obtained without deletion of window for this signal has a dominant frequency of 1.83 Hz. After deleting the windows, the obtained dominant frequency for the median curve is 1.74 Hz. The final analysis result 1.74 Hz is taken as the site dominant frequency.

The database module receives the summary table of basic earthquake information from the web crawler module and the summary table of earthquake supplementary information from the data processing module and merges them according to the ground motion signal to obtain the summary table of earthquake information, then split the summary table of earthquake information of all large earthquake stations into multiple sub-tables according to different large earthquake stations. Each seismic station corresponds to a sub-table, and the information in each sub-table is arranged in chronological order to form time series information, thereby obtaining a summary table of earthquake information for a single large earthquake station, and the site information of the site where the seismic station is located corresponds to the summary table of earthquake information for each single large earthquake station, as shown in FIG. 7.

S2: Prediction is performed by a neural network model to acquire a post-earthquake site dominant frequency, including establishing a dominant frequency prediction model of a neural network, and establishing a gated cyclic unit (GRU) model based on a neural network algorithm, which is used to process the time series information of the summary table of earthquake information of a single large earthquake station; training, testing and saving the dominant frequency prediction model, and using the ground motion information, ground motion intensity, dominant frequency of acceleration in the horizontal direction and site information to be predicted in the summary table of earthquake information of a single seismic station as the input of the dominant frequency prediction model for training, and testing and saving the dominant frequency prediction model after the training; in the prediction of the dominant frequency prediction model, inputting the ground motion information, the earthquake intensity index, the dominant frequency of the acceleration in the horizontal direction, and the site information to be predicted into the dominant frequency prediction model after the training, testing and saving, and obtaining the post-earthquake site dominant frequency as the output.

In the specific implementation, the site dominant frequency in the summary table of earthquake information of a single seismic station is used as the output of the model, and other parts are used as the inputs of the model, which are divided into a training set and a test set. The test set needs to contain the drop and recovery of the dominant frequency after one major earthquake, and the number of data in the test set is ⅓~¼ of the number of data in the training set. During the training, the average absolute error of the model is used as the loss function, and the minimum training loss function of the test set is used as the target of the model. Bayesian hyperparameter adjustment is performed on the model, and finally the model with the smallest training loss is saved for use.

The smaller the mean absolute error, the closer the predicted value of the model is to the real value, and the better the performance of the model. Hyperparameters refer to parameters such as the number of hidden layers in the GRU neural network, the number of hidden layer units, the learning rate, and the dropout ratio. The process of hyperparameter optimization adopts empirically determined parameters hyperparameter selection methods, such as random search, grid search and Bayesian parameter adjustment. The Bayesian optimization method makes assumption on the hyperparameters and the probability distribution of the corresponding objective function, and then adjusts the related parameters of the hyperparameters and the probability distribution of the objective function according to the pros and cons of the test results, and then adjusts the hyperparameters accordingly.

The process is implemented by python programming. After receiving a summary table of earthquake information of a single large earthquake station, and inputting the earthquake information to be predicted into the model, the subsequent steps may be automatically performed, and the site dominant frequency is output.

Figure 4:
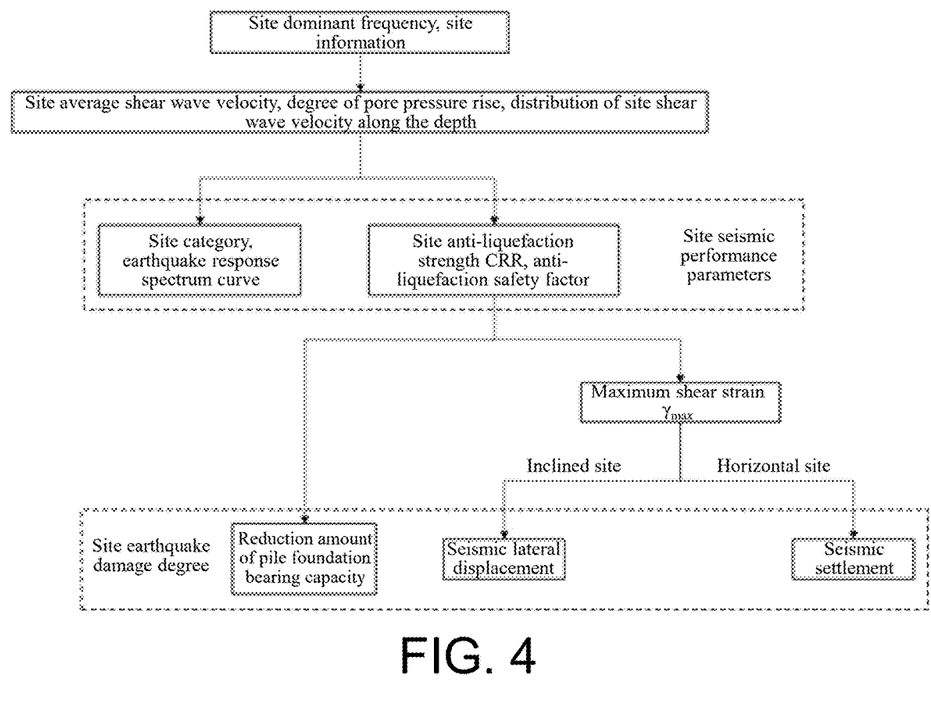
FIG. 4 is a technical flow chart for obtaining the site earthquake damage degree and anti-seismic performance parameters based on the average shear wave velocity of a site.

S3: A site earthquake damage degree and anti-seismic performance parameters are acquired on the basis of the post-earthquake site dominant frequency, as shown in FIG. 4, thereby completing rapid evaluation of site seismic liquefaction hazard.

S3.1. The average shear wave velocity of the site is obtained by calculating the post-earthquake site dominant frequency of where the seismic station is located.

The average shear wave velocity of the site is obtained through the following equation:

$$V_{savg} = 4Hf$$

Where $V_{savg}$ represents the average shear wave velocity of the site, H represents the thickness of the soil layer of the site, f represents the post-earthquake site dominant frequency obtained through prediction in step S2.

S3.2. The degree of pore pressure rise at the site where the seismic station is located is calculated.

The excess static pore pressure ratio of the site is obtained as the degree of pore pressure rise according to the following equation:

$$1 - r_u(t) = \left[\frac{f_0(t)}{f_{0, t=0}}\right]^4$$

S3.3. The site category and the site response spectrum curve are obtained according to the average shear wave velocity of the site and the thickness of the soil layer of the site.

S3.4. The distribution of post-earthquake site shear wave velocity along the depth is calculated, and the soil liquefaction resistance CRR and liquefaction safety factor of each soil layer are processed and obtained according to the distribution of the shear wave velocity along the depth.

The distribution of average shear wave velocity along the depth is obtained according to the following equation:

$$V_{s\,post-earthquake} = V_{s\,pre-earthquake}\left(\frac{V_{savg\,post-earthquake}}{V_{savg\,pre-earthquake}}\right)$$

Then, the soil liquefaction resistance CRR and liquefaction safety factor of different soil layers are calculated respectively according to the distribution of average shear wave velocity along the depth.

The soil liquefaction resistance of each soil layer on the site is obtained by the following equation:

$$CRR = r_c \frac{1}{P_a}\left[\frac{k_N \rho}{F(e_{min})}\right]^2 V_{s1}^4$$

$$V_{s1} = V_{s\,post-earthquake}\left(\frac{1+K_0}{3}\right)^{0.25}\left(\frac{P_a}{\sigma'_{v0}}\right)^m$$

Then the liquefaction safety factor FS is calculated through the following equations according to the soil liquefaction resistance:

$$FS = \frac{CRR}{CSR}$$

$$CSR = 0.65\left(\frac{a_{max}}{g}\right)\left(\frac{\sigma_{v0}}{\sigma'_{v0}}\right)r_d$$

S3.5. The reduction amount of pile foundation bearing capacity is obtained according to the liquefaction safety factor.

S3.6. The maximum shear strain is calculated according to the liquefaction safety factor, and then the seismic settlement for a horizontal site or the seismic lateral displacement for an inclined site are calculated and obtained through different formulas according to the maximum shear strain.

The maximum shear strain $\gamma_{max}$ is obtained according to the liquefaction safety factor through the following equations:

$$F_\alpha = 0.032 + 0.836\left(\frac{V_{s1}}{100}\right)^{1.976} - 0.190\left(\frac{V_{s1}}{100}\right)^{3.952}$$

$$\begin{cases} \gamma_{max} = 0, FS > 2 \\ \gamma_{max} = \min(0.5, 7.05(V_{s1}/100)^{-5.33}), \\ 0.035(2-FS)\left(\frac{1-F_\alpha}{FS-F_\alpha}\right), F_\alpha < FS < 2 \\ \gamma_{max} = \min(0.5, 7.05(V_{s1}/100)^{-5.33}), FS < F_\alpha \end{cases}$$

Then the terrain characteristics of the site are determined: if the site is an inclined site, the seismic lateral displacement is obtained according to the maximum shear strain processing; if the site is a horizontal site, the seismic settlement is obtained according to the maximum shear strain processing.

The seismic lateral displacement is determined through the following equation:

$$LD = C_h \int_0^{z_{max}} \gamma_{max} dz$$

The seismic settlement is determined through the following equations:

$$\Delta e = (e_0 + 0.3e_{max} - 1.3e_{min})R_0^* \gamma_{max}^m$$

$$S = \sum \frac{\Delta e}{1+e_0} H_i$$

Example

Figure 8:
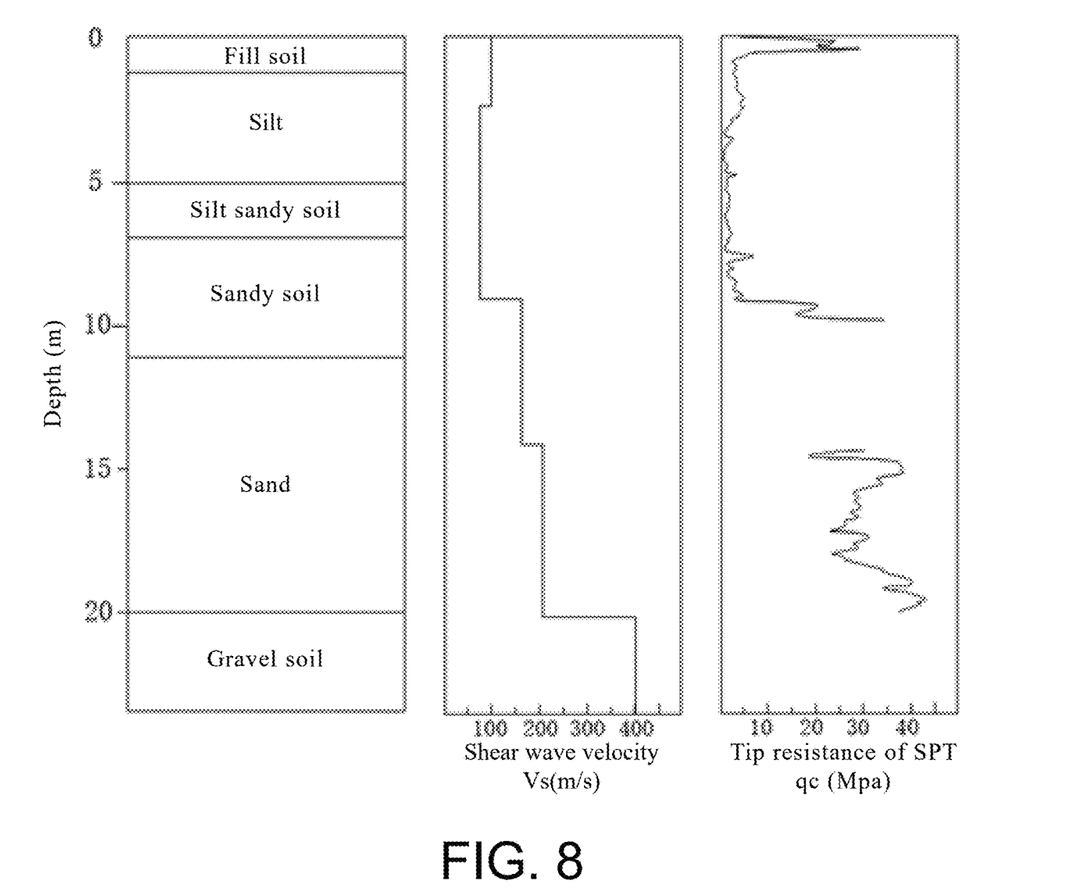
FIG. 8 is a sectional view of the soil layer of a certain site, including the variation of shear wave velocity and cone tip resistance in relation to change of depth.

The ground motion signals of a seismic station from 2010 to 2020 were collected. The soil profile information of the area where the seismic station is located is shown in FIG. 8, and the thickness of the overlying soft soil layer is 20 m.

Each ground motion signal is analyzed. The dominant frequency of the horizontal component corresponding to each ground motion signal and the ground motion intensity parameters are obtained. The HVSR method is performed to analyze the dominant frequency of the site, and then the ground motion information corresponding to each ground motion signal is collected, including the earthquake time, magnitude, hypocenter depth, hypocenter distance, azimuth of the hypocenter relative to the large earthquake station, etc. The above collected information is summarized and organized into the table as shown in FIG. 7.

The data is split into the training set and the test set, and the site dominant frequency is used as the output of the model, and other data is used as the input to the model.

Figure 9:
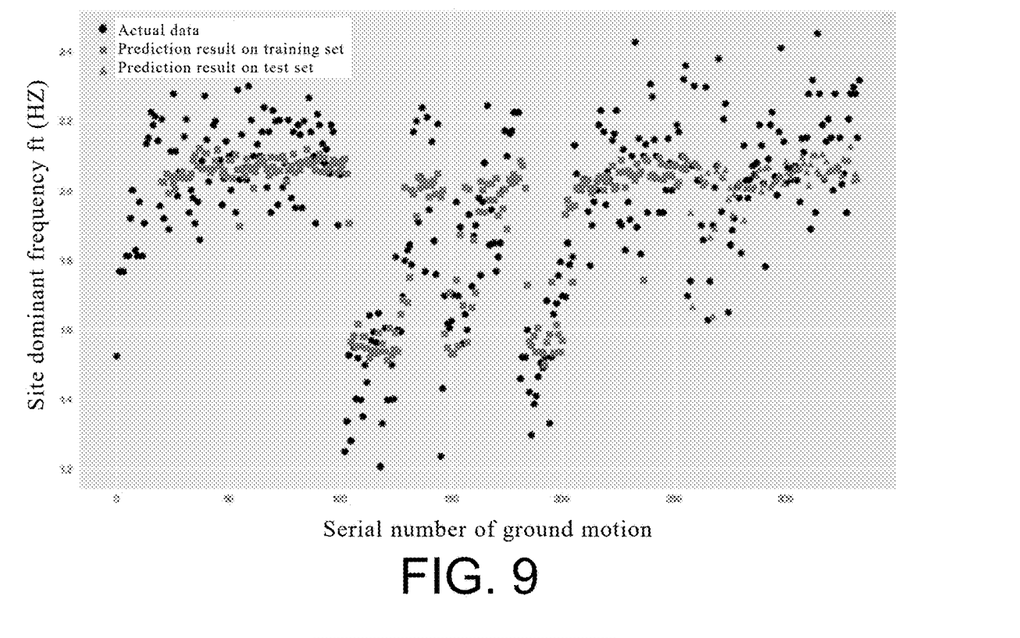
FIG. 9 is an effect diagram of a dominant frequency prediction model.

The GRU neural network model is established, the minimum loss on the training set is set as the objective, and Bayesian hyperparameter optimization is performed. Finally, the performance of the model on the training set and test set is shown in FIG. 9. The dots are the actual site prominent frequency data, the square dots are the predicted values of the model on the training set, and the triangle dots are the predicted values of the model on the test set.

The time of occurrence of a large ground motion signal since the last time the model received a ground motion signal is input, and the input time is set to 1 day after the last ground motion signal is received. The magnitude is set to 6.5, the hypocenter depth and distance are both set to 10, the horizontal peak acceleration 1 is set to 2000, the horizontal peak acceleration 2 is set to 2000, the vertical peak acceleration is set to 1000, the azimuth angle is set to 250, the absolute cumulative acceleration is set to 25, Arias intensity is set to 5, cav5 is set to 20, the dominant frequency of horizontal acceleration signal 1 is set to 2, and the dominant frequency of horizontal acceleration signal 2 is set to 2. The above parameters are input into the saved model, thereby obtaining the site dominant frequency as 1.36914163 hz.

The actual measured site dominant frequency of the last earthquake in 2020 is 2.317 hz. Under the action of the above-mentioned earthquake, the site dominant frequency obtained by the GRU neural network model is 1.36914163 hz.

The average shear wave velocity of the site is calculated.
Before the large earthquake:

$$V_{savg1} = 4Hf = 4 \times 20 \times 2.317 = 185.36 \text{ m/s}$$

After the large earthquake:

$$V_{savg2} = 4Hf = 4 \times 20 \times 1.369 = 109.52 \text{ m/s}$$

Combined with the code for seismic design of buildings, it can be acquired that the category of site has changed from class II to class III.

It can be seen from the implementation that the present disclosure is able to quickly evaluate the change of site performance under given earthquake conditions, and solves the problem that only the static seismic performance of soil is considered in previous earthquake damage evaluation.

What is claimed is:

1. A fast evaluation method of a site seismic liquefaction hazard based on artificial intelligence algorithm, comprising the following steps:
   S1: establishing a historical seismic and site information database;
   S2: performing a prediction by a neural network model according to a result of the S1 to acquire a post-earthquake site dominant frequency;
   S3: acquiring a site earthquake damage degree and seismic performance parameters on a basis of the post-earthquake site dominant frequency,
   wherein in the step S1, establishing the historical seismic and site information database comprises a demand input module, a web crawler module, a data processing module, and a database module connected in sequence;
   wherein the demand input module receives seismic station information and a ground motion signal collection time range, which are inputted, and then sends the seismic station information and the ground motion signal collection time range to the web crawler module;
   the web crawler module receives the seismic station information and the ground motion signal collection time range from the demand input module, according to a seismic station number and the ground motion signal collection time range, a web crawler is utilized on a large earthquake database website to crawl seismic stations corresponding to the seismic station number and all public ground motion signals, basic earthquake information and site information within the ground motion signal collection time range under the seismic stations, thereby illustrating a summary table of basic earthquake information; wherein a ground motion signal, the basic earthquake information and the site information are sent to the data processing module, and the summary table of the basic earthquake information is sent to the database module;
   the data processing module receives the ground motion signal from the web crawler module for analysis and processing, and obtains a dominant frequency of acceleration time-history signals in two horizontal directions, three earthquake intensity parameters and a site dominant frequency of where the seismic stations are located, then organizes the dominant frequency of the acceleration time-history signals in the two horizontal directions, the three earthquake intensity parameters and the site dominant frequency into a summary table of earthquake supplementary information and sends the summary table of the earthquake supplementary information to the database module;
   the database module receives the summary table of the basic earthquake information from the web crawler module and the summary table of the earthquake supplementary information from the data processing module and merges the summary table of the basic earthquake information and the summary table of the earthquake supplementary information according to the ground motion signal to obtain a summary table of earthquake information, then split the summary table of the earthquake information of all of the seismic stations into multiple sub-tables according to seismic stations, which are different, wherein each of the seismic stations corresponds to one of the sub-tables, and information in each of the sub-tables is arranged in a chronological order to obtain a summary table of earthquake information for a single seismic station, and the site information of a site where the seismic stations are located corresponds to the summary table of the earthquake information for each of the single seismic station.

2. The fast evaluation method of the site seismic liquefaction hazard based on the artificial intelligence algorithm according to claim 1, wherein in the data processing module, the site dominant frequency of where the seismic stations are located is processed and obtained according to the ground motion signal through the following method:
   a calculation process is performed through the following steps:
   S1.1. the ground motion signal is split into n parts according to a length of a window, and n windows are subjected to a horizontal-to-vertical spectral ratio analysis to obtain n horizontal-to-vertical spectral ratio spectrums of the ground motion signal, wherein a horizontal axis of the horizontal-to-vertical spectral ratio spectrums is a frequency, and a vertical axis is a horizontal-to-vertical spectral ratio, a frequency corresponding to a maximum horizontal-to-vertical spectral ratio is taken as a dominant frequency of the window in the horizontal-to-vertical spectral ratio spectrums of each of the windows;

S1.2. in the horizontal-to-vertical spectral ratio spectrums of each of the windows, the frequency of the horizontal axis of the horizontal-to-vertical spectral ratio spectrums remains unchanged, and an average of the horizontal-to-vertical spectral ratio of the vertical axis is taken to perform curve smoothing to obtain a median curve of the windows corresponding to the horizontal-to-vertical spectral ratio spectrums, a frequency corresponding to a maximum amplitude of the median curve is taken as a reference frequency $f_{t,m,0}$ of the window;

S1.3. a first dominant frequency set $X_0 = [f_{t,1}, f_{t,2}, \ldots, f_{t,n}]$ is established from dominant frequencies of all of the windows, wherein $f_{t,n}$ represents a dominant frequency of a n-th window at a time t, a mean $\bar{f}_{t,0}$ and a standard deviation $\sigma_{f,t,0}$ of the first dominant frequency set $X_0$ are calculated, and then an offset $y_0 = |f_{t,m,0} - \bar{f}_{t,0}|$ is calculated;

S1.4. in the first dominant frequency set $X_0$, the windows whose dominant frequencies fall outside ($\bar{f}_{t,0} - 0.50\,\sigma_{f,t,0}$, $\bar{f}_{t,0} + 0.50\,\sigma_{f,t,0}$) are deleted, horizontal-to-vertical spectral ratios of m windows, which are remaining, are averaged and subjected to the curve smoothing, thereby obtaining a median curve dominant frequency $f_{t,m,1}$ of each of the m windows;

S1.5. in a second dominant frequency set $X_1 = [f_{t,1}, f_{t,2}, \ldots, f_{t,m}]$ established from dominant frequencies of the m windows, which are remaining, a mean value $\bar{f}_{t,1}$ and a standard deviation $\sigma_{f,t,1}$ of the second dominant frequency set $X_1$ are calculated, and then an offset $y_1 = |f_{t,m,1} - \bar{f}_{t,1}|$ is calculated;

S1.6. an absolute value of a standard deviation difference between the first dominant frequency set $X_0$ and the second dominant frequency set $X_1$ before and after a deletion of the window is set as a first offset parameter $\varepsilon_1$, i.e., $\varepsilon_1 = |\sigma_{f,t,1} - \sigma_{f,t,0}|$; an absolute value of an offset difference between the first dominant frequency set $X_0$ and the second dominant frequency set $X_1$ before and after the deletion of the window is set as a second offset parameter $\varepsilon_2$, that is, $\varepsilon_2 = |y_1 - y_0|/y_0$;

S1.7. a judgment is made according to the first offset parameter $\varepsilon_1$ and the second offset parameter $\varepsilon_2$:

when the first offset parameter $\varepsilon_1$ and the second offset parameter $\varepsilon_2$ are both greater than or equal to 0.01, the m windows, which are remaining, are used as all of the windows and return to the S1.3 for processing, and a next loop iteration is performed;

when the first offset parameter $\varepsilon_1$ and the second offset parameter $\varepsilon_2$ are both less than 0.01, the median curve dominant frequency obtained from a last loop iteration is used as the site dominant frequency of the ground motion signal.

3. The fast evaluation method of the site seismic liquefaction hazard based on the artificial intelligence algorithm according to claim 1, wherein the step S2 comprises:

establishing a dominant frequency prediction model of a neural network, and establishing a gated cyclic unit model, which serves to process the summary table of earthquake information of a single seismic station;

training, testing and saving the dominant frequency prediction model, and using ground motion information, a ground motion intensity, a dominant frequency of an acceleration in a horizontal direction and site information in the summary table of the earthquake information of the single seismic station as inputs of the dominant frequency prediction model, and using a site dominant frequency as an output of the dominant frequency prediction model, inputting the ground motion information, the ground motion intensity, the dominant frequency of the acceleration in the horizontal direction and the site information to the dominant frequency prediction model for training, and testing and saving the dominant frequency prediction model after the training;

in the prediction of the dominant frequency prediction model, inputting the ground motion information, an earthquake intensity index, the dominant frequency of the acceleration in the horizontal direction, and the site information to be predicted into the dominant frequency prediction model after the training, testing and saving, and obtaining the post-earthquake site dominant frequency as an output.

4. The fast evaluation method of the site seismic liquefaction hazard based on the artificial intelligence algorithm according to claim 1, wherein the step S3 comprises:

S3.1. obtaining an average shear wave velocity of a site by calculating the post-earthquake site dominant frequency of where a seismic station is located;

S3.2. calculating a degree of pore pressure rise at where the seismic stations are located;

S3.3. obtaining a site category and a site response spectrum curve according to the average shear wave velocity of the site and a thickness of a soil layer of the site;

S3.4. calculating a distribution of a post-earthquake site shear wave velocity along a depth, and processing and obtaining a soil liquefaction strength and a liquefaction safety factor of each of soil layers according to the distribution of a shear wave velocity along the depth;

S3.5. obtaining a reduction amount of the pile foundation bearing capacity according to the liquefaction safety factor;

S3.6. calculating a maximum shear strain according to the liquefaction safety factor, and then calculating and obtaining a seismic settlement for a horizontal site or a seismic lateral displacement for an inclined site according to the maximum shear strain.

5. The fast evaluation method of the site seismic liquefaction hazard based on the artificial intelligence algorithm according to claim 4, wherein in the step S3.1, the average shear wave velocity of the site is obtained through the following equation:

$$V_{savg} = 4Hf$$

wherein in the equation, $V_{savg}$ represents the average shear wave velocity of the site, H represents the thickness of the soil layer of the site, f represents the post-earthquake site dominant frequency obtained through the prediction in the step S2.

6. The fast evaluation method of the site seismic liquefaction hazard based on the artificial intelligence algorithm according to claim 4, wherein in the step S3.2, an excess static pore pressure ratio of the site is obtained as the degree of pore pressure rise according to the following equation:

$$1 - r_u(t) = \left[\frac{f_0(t)}{f_{0,t=0}}\right]^4$$

wherein in the equation, $r_u(t)$ represents the excess static pore pressure ratio, and $r_u = u/\sigma'_{v0}$, u is an excess static pore water pressure, $\sigma'_{v0}$ is an effective overlying stress, $f_0(t)$ represents the post-earthquake site dominant frequency, $f_{0,t=0}$ represents an initial pre-earthquake site dominant frequency.

7. The fast evaluation method of the site seismic liquefaction hazard based on the artificial intelligence algorithm according to claim 4, wherein in the step S3.4, the distribution of the average shear wave velocity along the depth is obtained according to the following equation:

$$V_{s\ post-earthquake} = V_{s\ pre-earthquake}\left(\frac{V_{savg\ post-earthquake}}{V_{savg\ pre-earthquake}}\right)$$

wherein in the equation, $V_{s\ post-earthquake}$ represents a distribution of a shear wave velocity after the earthquake, $V_{s\ pre-earthquake}$ represents a distribution of a shear wave velocity before the earthquake, $V_{savg\ post-earthquake}$ represents an average shear wave velocity of the site after the earthquake, $V_{savg\ pre-earthquake}$ represents an average shear wave velocity of the site before the earthquake;

then, the soil liquefaction resistance CRR and the liquefaction safety factor of different soil layers are calculated respectively according to the distribution of the average shear wave velocity along the depth:

wherein the soil liquefaction resistance of each of the soil layers on the site is obtained through the following equations:

$$CRR = r_c \frac{1}{P_a}\left[\frac{k_N \rho}{F(e_{min})}\right]^2 V_{s1}^4$$

$$V_{s1} = V_{s\ post-earthquake}\left(\frac{1+K_0}{3}\right)^{0.25}\left(\frac{P_a}{\sigma'_{v0}}\right)^m$$

wherein in the equations, CRR represents the soil liquefaction resistance of the soil layer, $\gamma_c$ represents a reduction coefficient of multi-directional seismic vibration, $P_a$ represents a normalized reference pressure, $k_N$ represents a correlation coefficient between a strength and a toughness of the soil, which is determined by experiments, p represents a soil density, $F(e_{min})$ represents a function only related to a minimum void ratio, $V_{s1}$ represents a shear wave velocity corrected by an effective overburden stress, $K_0$ represents a lateral pressure coefficient of the soil layer, $\sigma'_{v0}$ represents the effective overburden stress of the soil layer; $V_{s1}$ represents a normalized shear wave velocity after considering correction of the effective overburden stress;

then the liquefaction safety factor FS is calculated through the following equations according to the soil liquefaction resistance:

$$FS = \frac{CRR}{CSR}$$

$$CSR = 0.65\left(\frac{a_{max}}{g}\right)\left(\frac{\sigma_{v0}}{\sigma'_{v0}}\right)r_d$$

wherein in the equations, CSR represents a cyclic shear stress ratio caused by the earthquake, $a_{max}$ represents a peak horizontal acceleration of a surface, g represents an acceleration of gravity, $\sigma_{v0}$ represents a total overlying stress of the soil layer, $\sigma'_{v0}$ represents the effective overburden stress of the soil layer, $\gamma_d$ represents a reduction coefficient of a shear stress along a depth.

8. The fast evaluation method of the site seismic liquefaction hazard based on the artificial intelligence algorithm according to claim 4, wherein in the step S3.6, the maximum shear strain $\gamma_{max}$ is obtained according to the liquefaction safety factor through the following equations:

$$F_\alpha = 0.032 + 0.836\left(\frac{V_{s1}}{100}\right)^{1-976} - 0.190\left(\frac{V_{s1}}{100}\right)^{3.952}$$

$$\begin{cases} \gamma_{max} = 0, FS > 2 \\ \gamma_{max} = \min(0.5, 7.05(V_{s1}/100)^{-5.33}), \\ 0.035(2-FS)\left(\frac{1-F_\alpha}{FS-F_\alpha}\right), F_\alpha < FS < 2 \\ \gamma_{max} = \min(0.5, 7.05(V_{s1}/100)^{-5.33}), FS < F_\alpha \end{cases}$$

wherein in the equations, $F_\alpha$ represents a reference value of the liquefaction safety factor, $V_{s1}$ represents a shear wave velocity corrected by an effective overburden stress, and FS represents the liquefaction safety factor;

then terrain characteristics of the site are determined: if the site is an inclined site, the seismic lateral displacement is obtained according to a maximum shear strain processing; if the site is a horizontal site, the seismic settlement is obtained according to the maximum shear strain processing:

the seismic lateral displacement is determined through the following equation:

$$LD = C_h \int_0^{z_{max}} \gamma_{max} dz$$

wherein in the equation, LD represents the seismic lateral displacement, $C_h$ represents parameters related to local soil properties; $z_{max}$ represents a thickness of an inclined soil layer;

the seismic settlement is determined through the following equations:

$$\Delta e = (e_0 + 0.3e_{max} - 1.3e_{min})R_0^* \gamma_{max}^m$$

$$S = \sum \frac{\Delta e}{1+e_0} H_i$$

wherein in the equations, $\Delta e$ represents a change in a void ratio of a foundation soil; $e_0$ represents an initial void ratio of the soil layer; $e_{max}$ represents a maximum void ratio of the soil layer; $e_{min}$ represents minimum void ratio of the soil layer; S represents a total settlement; $H_i$ represents a thickness of an i-th soil layer; $R_0^*$ represents a reference value of a residual volume strain, and m represents a power correlation coefficient between the maximum shear strain and the residual volume strain.

\* \* \* \* \*